United States Patent
Zisimopoulos et al.

(10) Patent No.: US 9,185,625 B2
(45) Date of Patent: Nov. 10, 2015

(54) METHOD AND APPARATUS FOR PROCESSING CONTROL MESSAGES IN A WIRELESS COMMUNICATIONS SYSTEM

(75) Inventors: Haris Zisimopoulos, Staines (GB); Craig Bishop, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 1044 days.

(21) Appl. No.: 13/266,038

(22) PCT Filed: Apr. 29, 2010

(86) PCT No.: PCT/KR2010/002708
§ 371 (c)(1),
(2), (4) Date: Oct. 24, 2011

(87) PCT Pub. No.: WO2010/126315
PCT Pub. Date: Nov. 4, 2010

(65) Prior Publication Data
US 2012/0044825 A1    Feb. 23, 2012

(30) Foreign Application Priority Data
May 1, 2009    (GB) .................................. 0907617.5

(51) Int. Cl.
*H04W 36/38*    (2009.01)
(52) U.S. Cl.
CPC .................................. *H04W 36/385* (2013.01)
(58) Field of Classification Search
None
See application file for complete search history.

(56) References Cited

U.S. PATENT DOCUMENTS

| 2006/0116118 | A1 | 6/2006 | Charriere et al. |
| 2007/0099664 | A1* | 5/2007 | Hwang .......................... 455/560 |
| 2008/0159223 | A1 | 7/2008 | Palat et al. |
| 2008/0293419 | A1 | 11/2008 | Somasundaram et al. |
| 2009/0005048 | A1 | 1/2009 | Bae et al. |
| 2010/0040020 | A1* | 2/2010 | Chen ............................. 370/331 |
| 2011/0044327 | A1* | 2/2011 | Mahdi et al. .................. 370/352 |
| 2011/0200011 | A1* | 8/2011 | Rune ............................. 370/331 |
| 2011/0274090 | A1* | 11/2011 | Hallensal et al. ............. 370/331 |

FOREIGN PATENT DOCUMENTS

| CN | 1318929 A | 10/2001 |
| CN | 1934802 A | 3/2007 |
| CN | 101217800 A | 7/2008 |
| EP | 1 182 900 A1 | 2/2002 |
| EP | 1 983 796 A1 | 10/2008 |
| EP | 1983796 A1 | 10/2008 |
| WO | 2008/117966 A1 | 10/2008 |

* cited by examiner

*Primary Examiner* — Christine Duong
(74) *Attorney, Agent, or Firm* — Jefferson IP Law, LLP (57) ABSTRACT

There is described a method of processing control messages received by a wireless communication network from a wireless communication device. The method comprises: monitoring received control messages sent by the wireless communication device to identify control messages conveying information indicating whether or not the wireless communication device has a handover capability associated with performing a handover between the packet-switched and circuit-switched domains; for any such identified control message which indicates that the corresponding wireless communication device does not have said handover capability, modifying the control message to indicate that said corresponding wireless communication device does have said handover capability and forwarding the modified control message to the core network; and storing data indicative of whether or not the wireless communication device has said handover capability.

20 Claims, 8 Drawing Sheets

METHOD AND APPARATUS FOR PROCESSING CONTROL MESSAGES IN A WIRELESS COMMUNICATIONS SYSTEM

TECHNICAL FIELD

This invention relates to a method of processing control messages in a wireless communications system, and apparatus for implementing that method. The invention has particular, but not exclusive, relevance to processing control messages which travel between a mobile station, such as a cellular telephone, and a core network via an IMS-enabled Home NodeB (HNB).

BACKGROUND ART

HNBs (also referred to as femto-cells) are small transceivers which will be placed in customer's homes, workplaces or other locations in order to increase network coverage and to offload signalling and user plane traffic from network macro-cells. In order to make the installation of a HNB attractive to a customer, HNBs are expected to be offered with preferential calling rates and are also expected to provide additional services not provided by a legacy CS macrocell. It is anticipated that more and more customers will switch from fixed landlines to mobile phone usage at home or in the workplace, resulting in a significant increase in circuit-switched (CS) voice traffic over the mobile communication networks. In order to avoid needing to upgrade legacy mobile switching centres (MSCs) and CS core networks in view of this increase in demand, the possibility of offloading the additional CS voice traffic via the HNB to the IP Multimedia Subsystem (IMS) is being discussed by the 3GPP, with various architectural alternatives being elaborated on in TR 23.832 "IMS Aspects of Architecture for Home NodeB".

By the time Home NodeBs are deployed, it is expected that User Equipments (UEs) having IMS clients and supporting handover between the IMS and the CS domain using Single Radio Voice Call Continuity (commonly known as SRVCC) will also be available. UEs having IMS clients are expected to be configured to prefer IMS VoIP when within coverage of an HNB, as HNBs are expected to provide one or a few UEs with good enough QoS to provide Voice services via the IMS.

At the same time, HNBs are also expected to serve UEs which do not have an IMS client (e.g. pre-release 9 legacy UEs), which use normal CS procedures to establish voice calls. The Inter-Working Function (IWF) in the Home NodeB is expected to "translate" the CS signalling (CS 24.008 Call Control and the related user plane media) from such UEs to IMS signalling and VoIP traffic. The result of this approach is that from the core network's point of view the call is handled as an IMS PS call regardless of whether the UE supports PS voice call functionality (i.e. whether it is IMS capable or not).

As discussed above, the HNB IMS subsystem is to act like an adaptor between the CS and PS user planes and call control functions. The whole IMS HNB subsystem is expected to be transparent to the core network. For a practical deployment, it is likely that the Macrocell(s) surrounding the HNB IMS subsystem will be incapable of supporting PS voice traffic with the same QoS provided by the HNBs. It is therefore preferred that if the UE has Single Radio Voice Call Continuity (SRVCC) capability then the handout from HNB coverage to outside macrocell is based on the SRVCC procedures defined in 3GPP TS 23.216 "Single Radio VCC; Stage 2". At the moment there is no mechanism which allows the handover of a call leg with a legacy UE not having SRVCC capability while in the same network also allowing an SRVCC handover to occur for UEs with SRVCC capability. Without such a mechanism, either:

- the UEs which are IMS capable will have to use CS when they are in IMS HNB coverage (i.e. UEs cannot use VoIP/SRVCC even if they are capable of doing so) unless the adjacent macrocells are upgraded to support VoIP; or
- the CN has to implement different handout procedures based on the capabilities of the UEs.

The present invention addresses the above problem. Aspects of the present invention are set out in the accompanying claims.

DISCLOSURE OF INVENTION

Solution to Problem

In brief, in an embodiment of the present invention a functional component of the Home NodeB subsystem modifies control messages from a UE which does not have SRVCC capability in such a way that the core network believes that the UE does have SRVCC capability, and stores the handover capabilities of the UE in a manner like supporting the SRVCC capability. Whenever the network sends a Handover Command with SRVCC extensions, the Home NodeB subsystem checks whether or not the associated UE has SRVCC capability using the data stored by the Home NodeB subsystem, and if it does not then the SRVCC extensions are stripped from the Handover Command.

BRIEF DESCRIPTION OF DRAWINGS

An embodiment of the invention will now be discussed with reference to the accompanying drawings, in which.

BEST MODE FOR CARRYING OUT THE INVENTION

Figure 1:
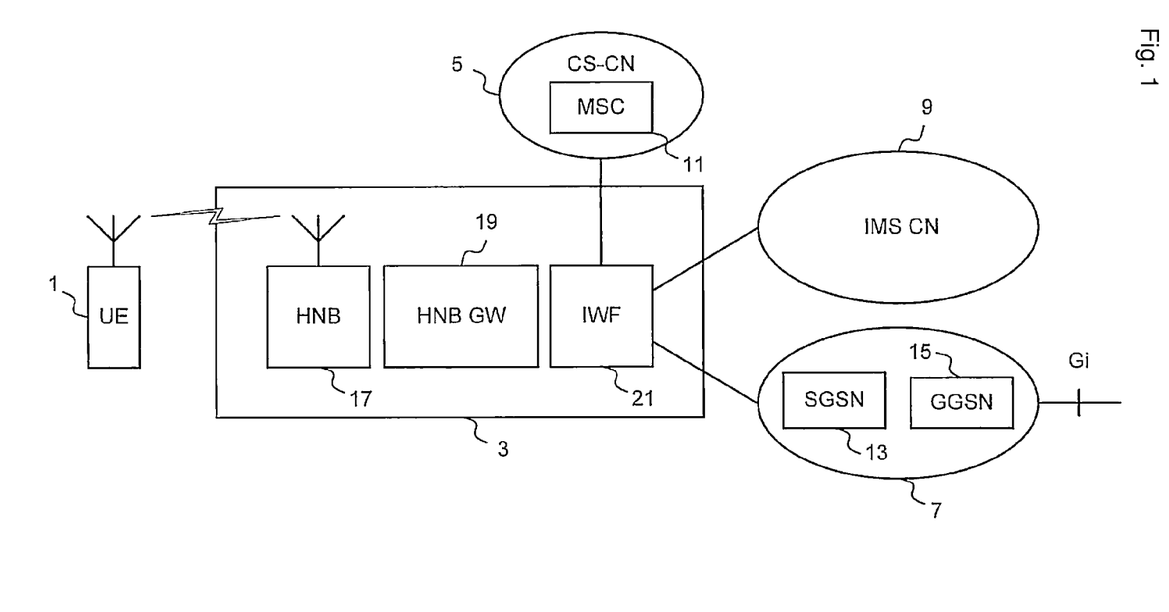
FIG. 1 schematically shows the main components of a mobile communication system according to an embodiment of the invention.

As shown in FIG. 1, in an embodiment of the present invention a mobile communication system enables a User Equipment (UE) 1 to communicate, via a Home NodeB (HNB) subsystem 3, with one or more of a circuit-switched (CS) core network 5, a packet-switched (PS) core network 7 and the IP multimedia Subsystem (IMS) core network 9. The CS core network 5 includes a conventional Mobile Switching Centre (MSC) 11, and the PS core network 7 includes a conventional SGSN 13 and a conventional Gateway GPRS Support Node (GGSN) 15. The communication between the UE 1 and the HNB subsystem 3 is via a wireless communication link.

The HNB subsystem 3 includes a Home NodeB (HNB) 17, a HNB Gateway (HNB GW) 19 and an Inter-Working Function (IWF) 21. In this embodiment, the HNB 17, the HNB GW 19 and the IWF 21 all form part of a customer premises equipment (CPE) which is installed into the home or workplace of a subscriber of the mobile communication system. The HNB subsystem 3 provides a radio link with a small number of UEs 1 having a high Quality of Service (QoS) within a limited coverage area.

In this embodiment, the HNB subsystem 3 routes voice calls via the IMS core network 9. For UEs 1 with an IMS client, an IMS VoIP communication link between the UE 1 and the IMS core network 9 is set up, with the HNB subsystem 3 providing an access node. However, for UEs 1 without an IMS client, a CS voice call link is established between the UE and the HNB subsystem 3, which acts like an adaptor translating CS 24.008 CC signalling to IMS signalling so that an IMS VoIP communication link exists between the HNB subsystem 3 and the IMS core network 9.

Figure 2:
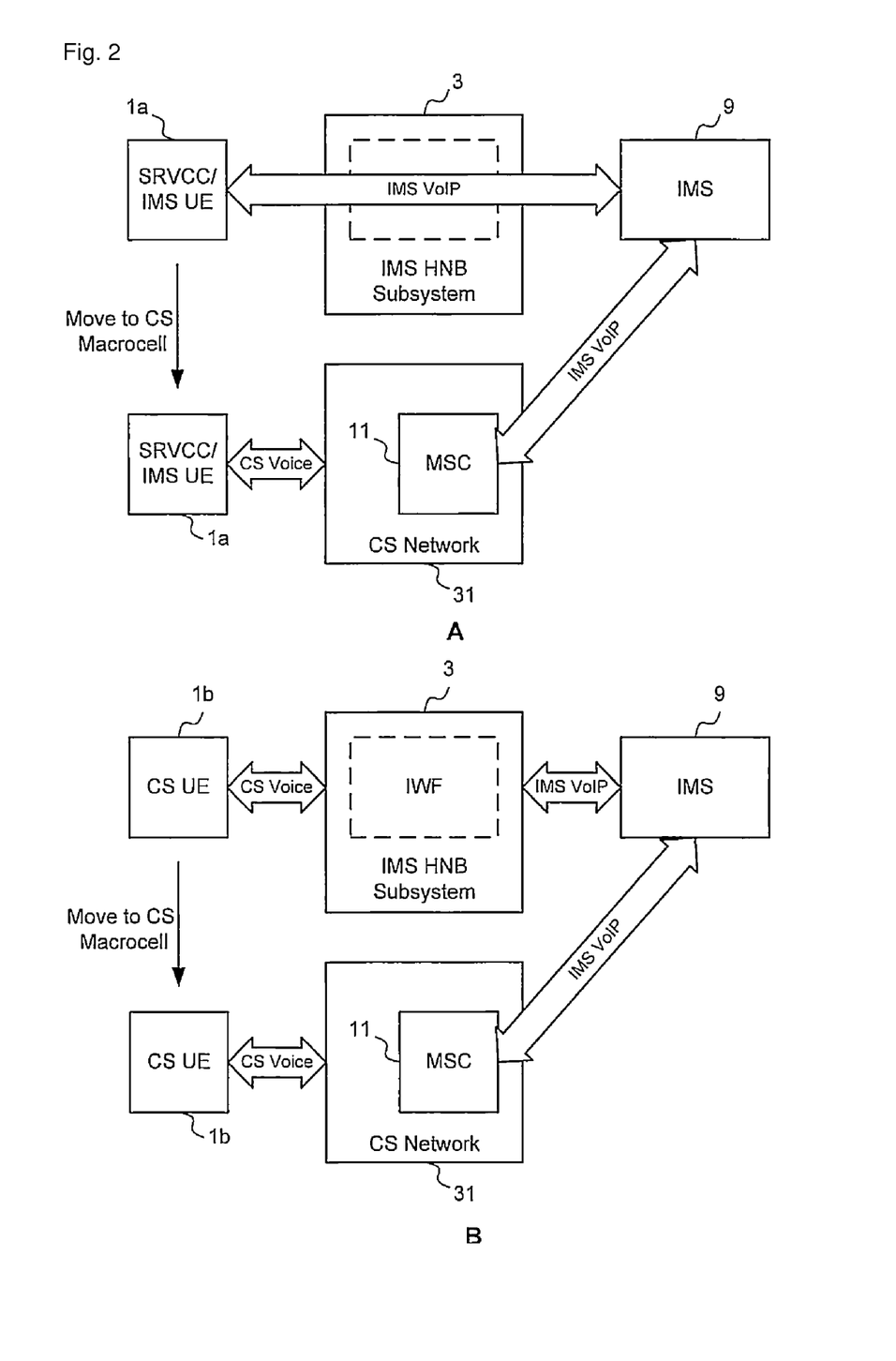
FIG. 2A schematically shows the handover of a voice call to an SRVCC-capable user equipment (UE) from an IMS Home NodeB to a CS macrocell in the mobile communication system of FIG. 1.
FIG. 2B schematically shows the handover of a voice call to a legacy UE from an IMS Home NodeB to a CS macrocell in the mobile communication system of FIG. 1.

The present invention facilitates the handover (sometimes referred to as handout) of a voice call from the HNB subsystem to a CS macrocell using the SRVCC procedures defined in 3GPP TS 23.216 "Single Radio VCC; Stage 2". Procedures are already defined for routing a CS voice call via the IMS domain. The handover of a voice call leg with a UE 1a having an IMS client and SRVCC capability from a HNB subsystem 3 to a CS macrocell forming part of a CS network 31, as shown in FIG. 2A, can utilise the SRVCC procedures. However, for a UE 1b which does not have an IMS client and SRVCC capability (hereafter called a legacy UE), the handover of a voice call leg with the legacy UE 1b from the HNB subsystem 3 to a CS macrocell requires a new functionality within the HNB subsystem 3. In this embodiment, this new functionality is implemented in the IWF 21 of the HNB subsystem 3.

The new functionality implemented in the IWF 21 has two aspects. The first aspect is to modify any control messages from a legacy UE which would be interpreted to indicate that the legacy UE does not have the capability to perform SRVCC handover so that the control message would be interpreted to mean that the UE did have that capability. In this way, the network will apply SRVCC procedures when performing a handover. The second aspect is that when the network initiates a handover of a voice call leg with a legacy UE in accordance with SRVCC procedures, the handover command is modified to remove SRVCC-related content prior to forwarding the handover command to the legacy UE. In this way, the UE performs a conventional handover operation.

Figure 3:
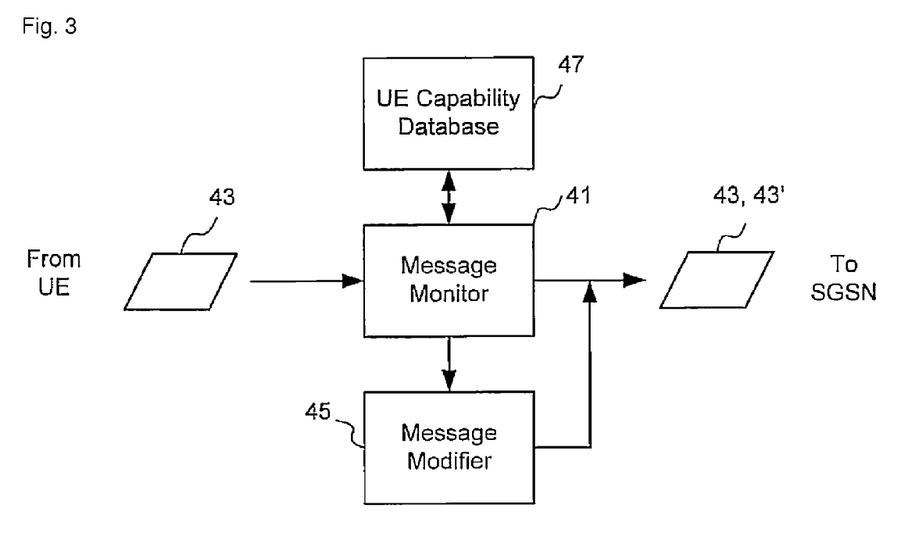
FIG. 3 is a functional block diagram schematically showing the processing of a control message by an interworking function (IWF) forming part of a Home NodeB in the mobile communication system illustrated in FIG. 1.

FIG. 3 schematically shows the main functional components of the IWF 21 for implementing the first aspect of the new functionality. As shown, the IWF 21 includes a message monitor 41 for determining if a received control message 43 indicates a lack of SRVCC capability; a message modifier 45 for modifying a control message so that it indicates SRVCC capability, and a UE capability database 47 which stores data identifying UEs which do not have SRVCC capability.

Figure 4:
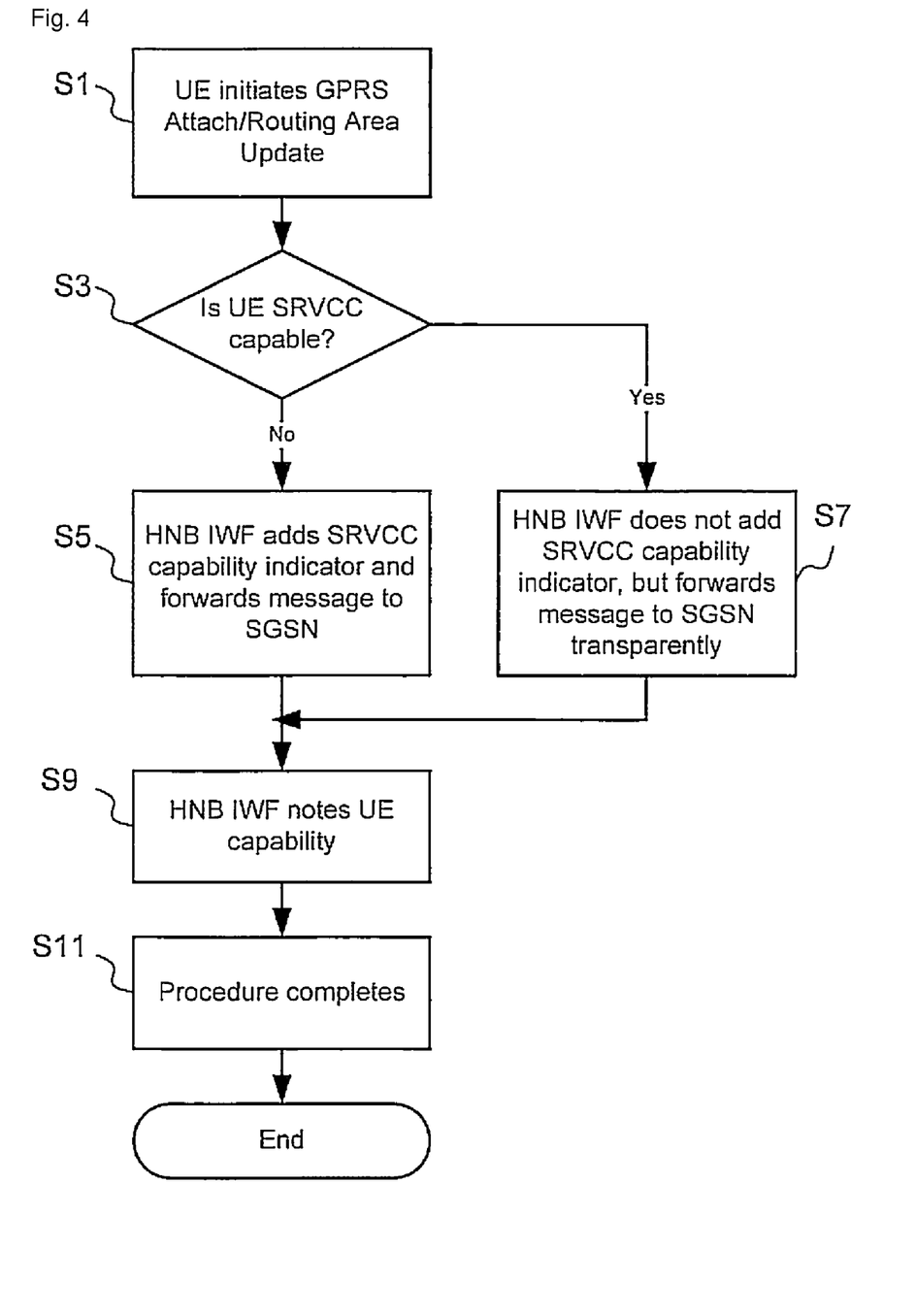
FIG. 4 is a flow chart showing the main steps performed when a UE initiates a GPRS Attach or a Routing Area Update.

Examples of control messages which may indicate that a UE has the capability to perform SRVCC handover include the GPRS Attach message and the Routing Area Update message. As shown in FIG. 4, following the sending of a GPRS Attach message or a Routing Area Update message, as S1, the message monitor 41 determines if the UE is SRVCC capable, at S3. If the UE is not SRVCC capable, the message 43 is forwarded to the message modifier 45 which adds, at S5, an SRVCC capability indicator and then forwards the modified message 41' to the SGSN. If the UE is SRVCC capable, the message monitor 41 forwards, at S7, the message transparently to the SGSN. The message monitor 41 also notes, at S9 the International Mobile Subscriber Identity (IMSI) of the UE together with information indicating whether or not it has SRVCC capability in the UE capability database 47. The procedure then completes, at S11.

Figure 5:
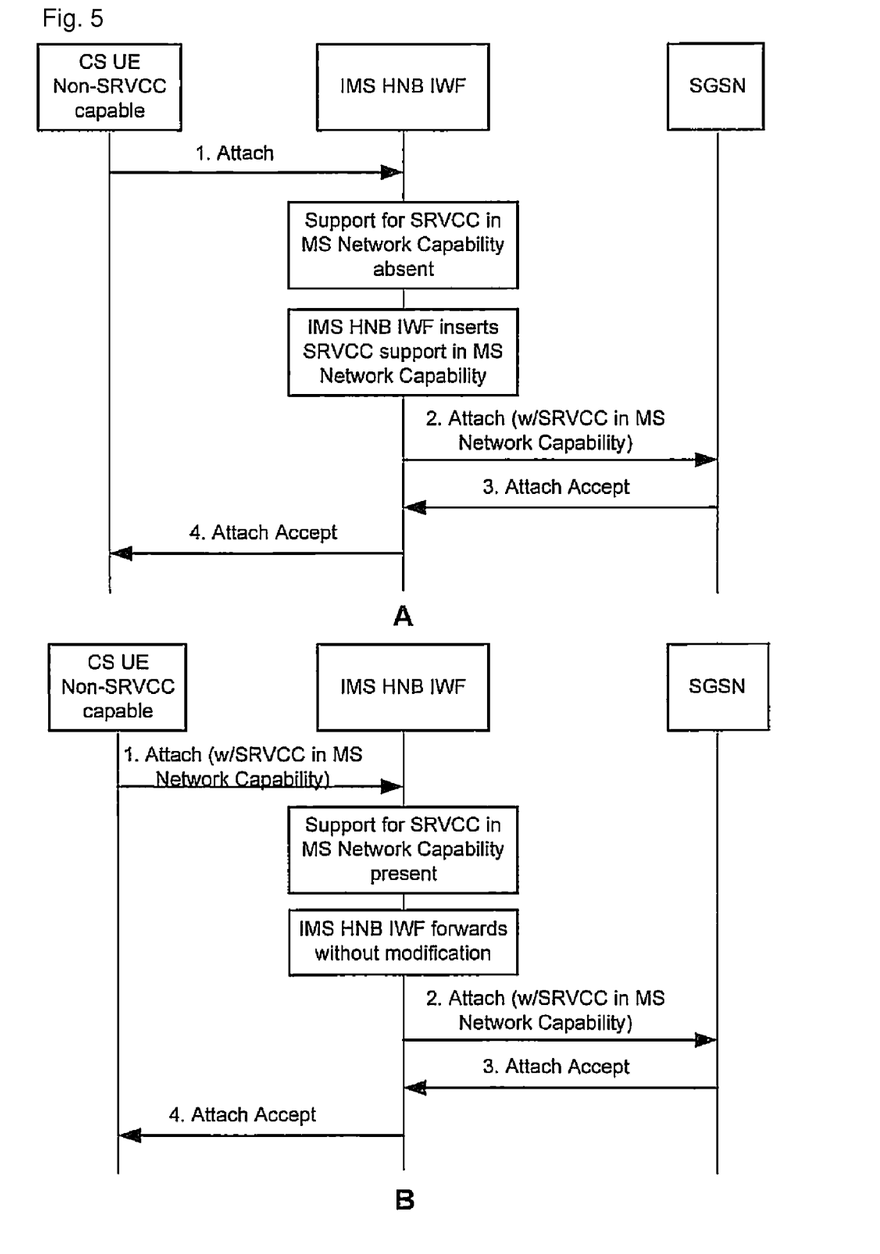
FIG. 5A shows the interaction between a legacy UE, an IMS HNB IWF and a serving GPRS support node (SGSN) when performing GPRS Attach in the mobile communication system illustrated in FIG. 1.
FIG. 5B shows the interaction between a UE with SRVCC capability, an IMS HNB IWF and an SGSN performing GPRS Attach in the mobile communication system illustrated in FIG. 1.

FIG. 5A shows the messages sent when a legacy UE 1 performs a GPRS Attach over an IMS capable HNB subsystem 3. In particular:

1. the legacy UE 1 sends a GPRS Attach message which does not include "SRVCC capability" in the "MS Network Capability";

2. the IWF of the HNB subsystem 3 notes the absence of support for SRVCC in the "MS Network Capability", inserts SRVCC support and sends the GPRS Attach message indicating support for SRVCC capability to the SGSN;

3. the SGSN responds by sending an Attach Accept message to the HNB subsystem 3; and 4. the HNB subsystem 3 forwards the Attach Accept to the legacy UE 1.

FIG. 5B shows the messages sent when a SRVCC-capable UE 1 performs a GPRS Attach over an IMS capable HNB subsystem 3. In particular:

1. the SRVCC-capable UE 1 sends a GPRS Attach message including "SRVCC capability" in the "MS Network Capability";

2. the IWF of the HNB subsystem 3 notes that the UE 1 has SRVCC capability, and forwards the GPRS Attach message unmodified to the SGSN;

3. the SGSN responds by sending an Attach Accept message to the HNB subsystem 3; and 4. the HNB subsystem 3 forwards the Attach Accept to the SRVCC-capable UE 1.

Figure 6:
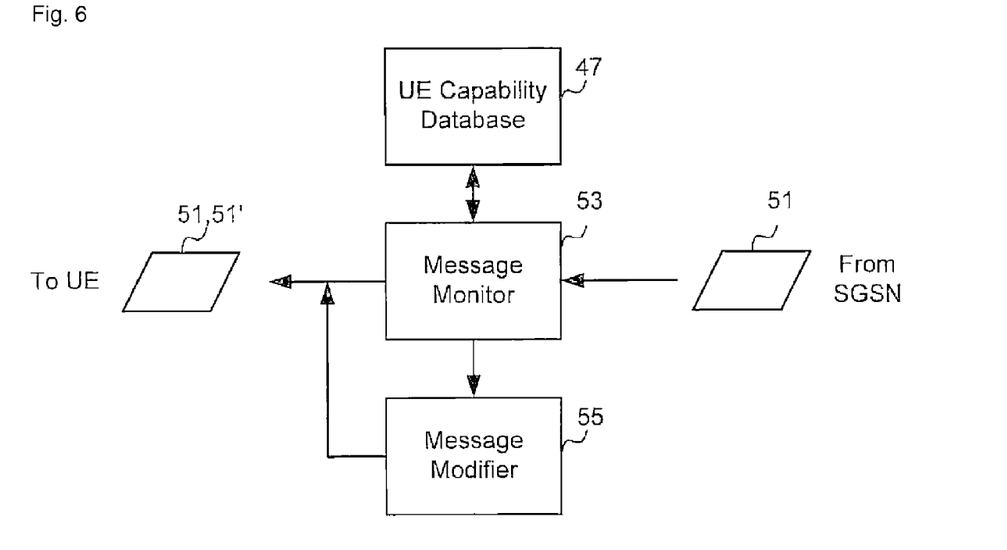
FIG. 6 is a functional block diagram schematically showing the processing of a handover request message by the IWF forming part of the Home NodeB in the mobile communication system illustrated in FIG. 1.
Figure 7:
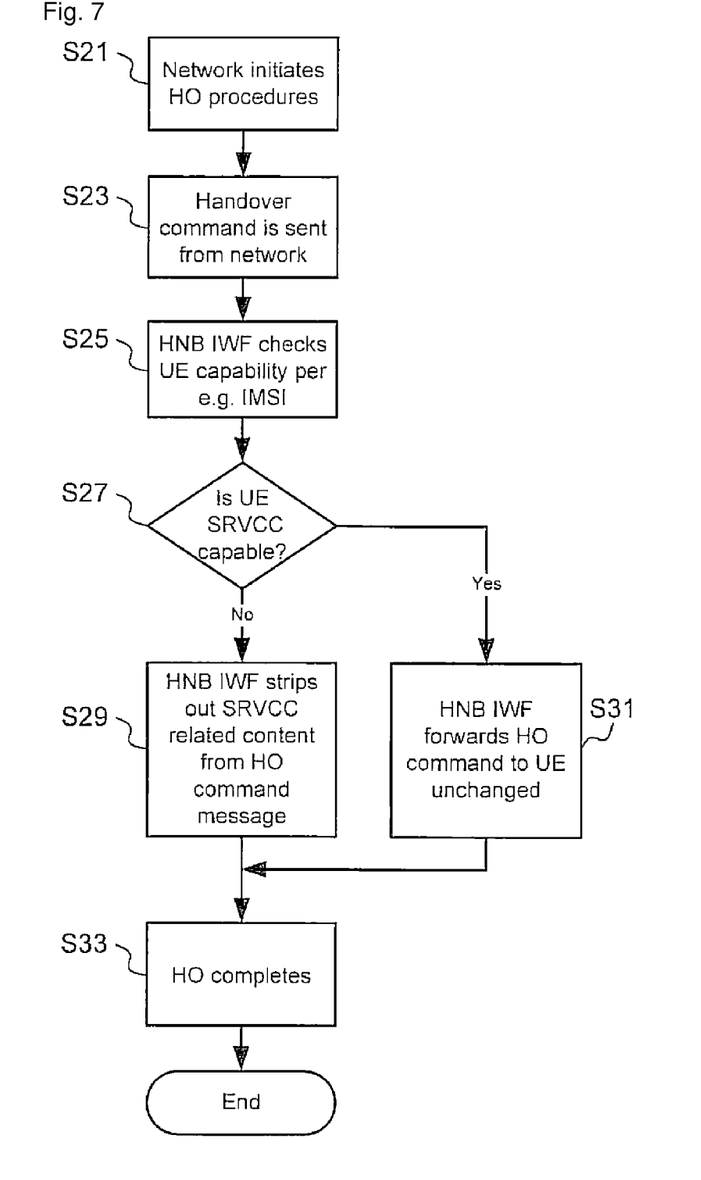
FIG. 7 is a flow chart showing the main steps performed when a network initiates a handover of a communication link with a UE from a Home NodeB to a CS macrocell.

FIG. 6 schematically shows the main components of the IWF 21 for implementing the second aspect of the new functionality. As shown, a Handover Command message 51 is input to a message monitor 53 which monitors for Handover Command messages, and is connected to the UE capability database 47 and a message modifier 55. As shown in FIG. 7, following initiation, at S21, of a handover (HO) procedure by the network, a Handover Command 51 is sent, at S23, by the network. The message monitor 53 in the IWF 21 of the HNB subsystem 3 checks, at S25, the SRVCC capability of the UE 1 by using the IMSI of the UE 1 to look up the SRVCC capability in the UE capability database 47.

If the message monitor 53 determines, at S27, that the UE is not SRVCC capable then the Handover Command message 51 is sent to the message modifier 55 which strips the SRVCC-related content out of the Handover Command message 51 to form a modified Handover Command message 51' which is forwarded to the UE 1. If the message monitor 53 determines, at S27, that the UE 1 is SRVCC capable, the IWF 21 forwards, at S31, the Handover Command message 51 to the UE 1 unchanged. The handover operation then completes, at S33.

Figure 8:
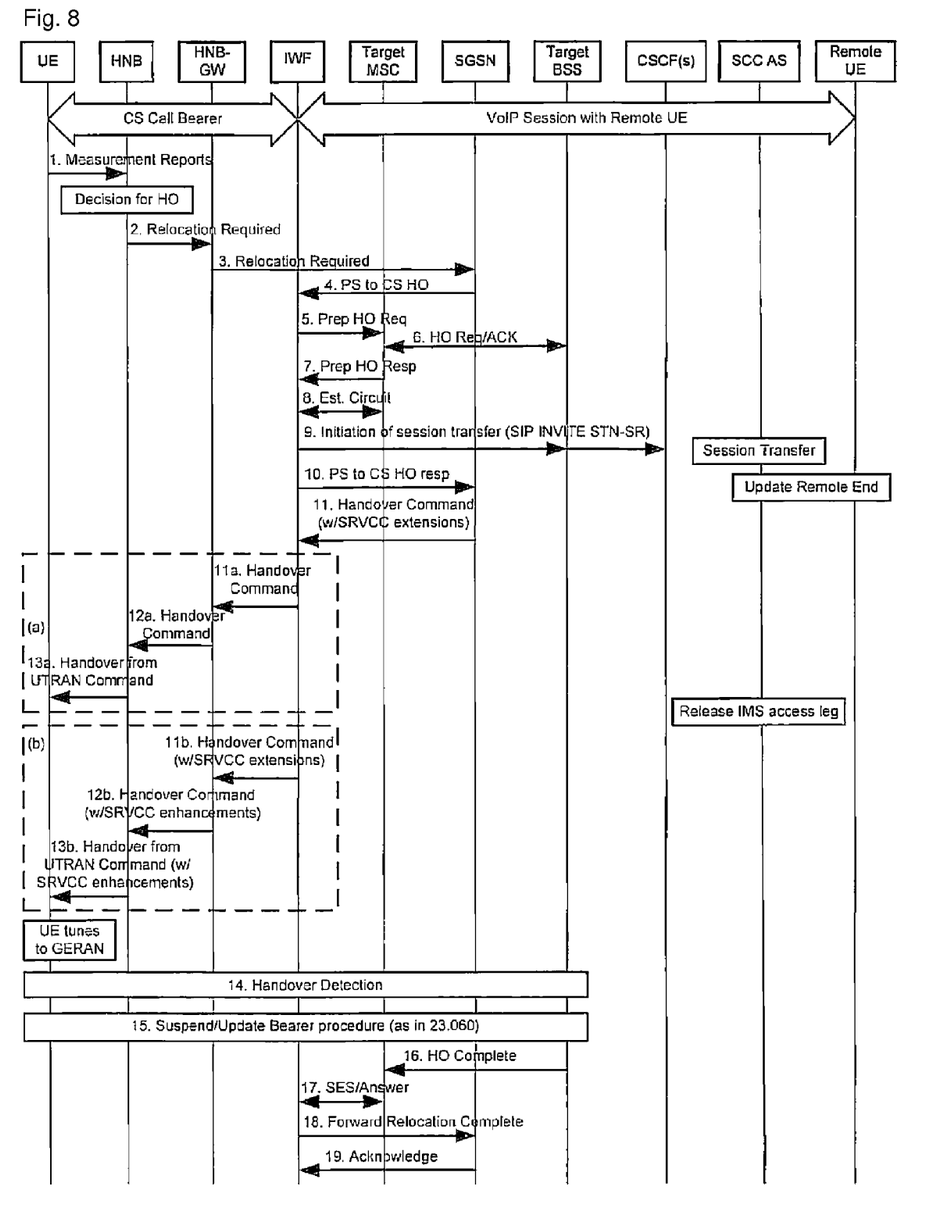
FIG. 8 shows the interaction between various components of the mobile communication system illustrated in FIG. 1 when performing the handover of a communication link with a UE from a Home NodeB to a CS macrocell.

FIG. 8 shows the interchange of messages between various components of the mobile communication system to effect a PS to CS handover. The messages 1 to 10 are conventional and will not therefore be described in detail here. Similarly, procedure following receipt of the Handover from UTRAN Command by the UE 1 is conventional and will not be described in detail here.

If the UE is not SRVCC-capable, then the message flow from the sending of the Handover Command message is as follows:

11. the SGSN sends a Handover Command message with SRVCC extensions to the UE;

11a. the IWF 21 intercepts the Handover Command message and, having determined that the UE is not SRVCC-capable, strips out the SRVCC extensions and forwards the modified Handover Command message to the HNB-GW 19;

12a. the HNB-GW 19 forwards the modified Handover Command message to the HNB 17; and 13a. the HNB 17 sends a Handover from UTRAN Command message to the UE 1.

On the other hand, if the UE is SRVCC-capable, then the message flow from the sending of the Handover Command message is as follows:

11. the SGSN sends a Handover Command message with SRVCC extensions to the UE;

11b. the IWF 21 intercepts the Handover Command message and, having determined that the UE is SRVCC-capable, forwards the Handover Command message unchanged to the HNB-GW 19;

12b. the HNB-GW 19 forwards the Handover Command message with SRVCC extensions to the HNB 17; and 13b. the HNB 17 sends a Handover from UTRAN Command message with SRVCC extensions to the UE 1.

In the described embodiment, the UE capability database stores information indicating whether or not a UE has SRVCC capability in association with the IMSI of the UE. Alternatively, other identification information for the UE could be used. The IMSI is, however, convenient as it is included in all the control messages which indicate whether or not the UE has SRVCC continuity.

The UE capability database could store simply a list of the identities (e.g. IMSIs) of the UEs which have SRVCC capability, in which case no new data is stored if the control message indicates that the UE does not have SRVCC capability, as the stored data would still be indicative of which UEs have SRVCC capability and which do not have SRVCC capability. Alternatively, the UE capability database could simply store a list of the identities of the UEs which do not have SRVCC capability. However, storing a list of the identities of the UEs which do have SRVCC capability is at least initially preferred as it is expected that at the time of deployment there will be fewer UEs with SRVCC capability than with SRVCC capability.

While the present invention has been described from the viewpoint of allowing the core network to implement SRVCC continuity procedures, it will be appreciated that the same novel techniques could be used to allow the core network to implement other handover procedures between the PS domain and the CS domain.

Those skilled in the art will recognise that a UE could be one of a number of wireless communication devices including cellular phones (sometimes referred to as mobile phones), personal digital assistants (PDAs), laptop computers and the like. Further, the wireless communication device could be a desktop computer or the like having a wireless network card.

Although in the above-described embodiment the new functionality is implemented by the IWF 21 of customer premises equipment for a Home NodeB subsystem, the new functionality could alternatively be implemented by other components of the Home NodeB subsystem, for example the Home NodeB itself or the Home NodeB Gateway. Further, the new functionality could be implemented by network entities remote from the customer premises.

In the above description, any reference to a Home NodeB (HNB) could be replaced by a reference to any other femtocell device with different radio access technology that is capable for PS to CS handover. The present invention is applicable to all of the architectural alternatives outlined in TR 23.832. Further, the invention is also applicable to other wireless access networks.

The embodiment described with reference to the drawings comprises a processing apparatus and involve processes performed in the processing apparatus. The invention also extends to computer programs, particularly computer programs on or in a carrier, adapted for putting the invention into practice. The program may be in the form of source code, object code, a code intermediate to source code and object code such as in partially compiled form, or in any other form suitable for using in the implementation of the processes according to the invention.

The carrier may be any entity or device capable of carrying the program. For example, the carrier may comprise a storage medium, such as a ROM, for example a CD-ROM or a semiconductor ROM, or a magnetic recording medium, for example a floppy disc or a hard disc, or an optical recording medium. Further, the carrier may be a transmissible carrier such as an electronic or optical signal which may be conveyed via electrical or optical cable or by radio or other means.

The carrier may be an integrated circuit in which the program is embedded, the integrated circuit being adapted for performing, or for use in the performance of, the relevant processes.

Although the invention may be implemented by software, it will be appreciated that alternatively the invention could be implemented by hardware devices or a combination of hardware devices and software.

The invention claimed is:

1. A method of processing control messages received by a wireless communication network from a wireless communication device, the method comprising:

monitoring received control messages sent by the wireless communication device to identify control messages conveying information indicating whether or not the wireless communication device has a handover capability associated with performing a handover between packet-switched and circuit-switched domains;

for any such identified control message which indicates that the corresponding wireless communication device does not have said handover capability, modifying the control message to indicate that said corresponding wireless communication device does have said handover capability and forwarding the modified control message to a core network; and storing data indicative of whether or not the wireless communication device has said handover capability.

2. The method of claim 1, wherein the control message is one of a General Packet Radio Service (GPRS) Attach message and a Routing Area Update (RAU) message.

3. The method of claim 1, wherein said storing of the data comprises:
  storing identity information for wireless communication devices which have said handover capability, and
  not storing identity information for wireless communication devices not having said handover capability.

4. The method of claim 1, wherein said storing of the data comprises storing identity information identifying the wireless communication device in association with whether or not the wireless communication device has said handover capability.

5. The method of claim 4, wherein the identity information comprises an International Mobile Subscriber Identity (IMSI).

6. A method of processing control messages received by a wireless access network from a core network, the method comprising:
  monitoring received control messages sent by the core network to identify control messages for commanding the wireless access network to perform a handover operation of a call leg with a wireless communication device, said handover command control message comprising information relating to a handover capability associated with performing a handover between packet-switched and circuit-switched domains;
  for any such identified handover command control message, determining identification data for the corresponding wireless communication device and determining whether or not the corresponding wireless communication device has said handover capability using stored data indicating whether or not a wireless communication device has said handover capability; and
  if the corresponding wireless communication device does not have said handover capability:
    modifying the handover command control message to remove information relating to said handover capability, and
    forwarding the modified handover command control message to the wireless communication device.

7. The method of claim 6, wherein the handover capability is Single Radio Voice Call Continuity (SRVCC).

8. A network entity comprising:
  a memory storing a program; and
  a processor programmed to execute the program to:
    monitor received control messages sent by a wireless communication device to identify control messages conveying information indicating whether or not the wireless communication device has a handover capability associated with performing a handover between packet-switched and circuit-switched domains,
    process any such control message identified by the message monitor which indicates that the corresponding wireless communication device does not have said handover capability by modifying the control message to indicate that said corresponding wireless communication device does have said handover capability, and
    store, in a user equipment (UE) capability database, data indicative of whether or not the wireless communication device has said handover capability.

9. The network entity of claim 8, wherein the processor is further programmed to execute the program to identify a General Packet Radio Service (GPRS) Attach message and a Routing Area Update (RAU) message.

10. The network entity of claim 8, wherein the UE capability database is further configured to store identity information identifying the wireless communication device in association with whether or not the wireless communication device has said handover capability.

11. The network entity of claim 10, wherein the identity information comprises an International Mobile Subscriber Identity (IMSI).

12. A network entity comprising:
  a memory storing a program; and
  a processor programmed to execute the program to:
    monitor received control messages sent by a core network to identify control messages for commanding a wireless access network to perform a handover operation of a call leg with a wireless communication device,
    for any such identified handover command control message, determine identification data for the corresponding wireless communication device and determine whether or not the corresponding wireless communication device has said handover capability using data stored in a data store indicating whether or not a wireless communication device has said handover capability, and
    modify the handover command control message to remove information relating to said handover capability if the message monitor determines said corresponding wireless communication device does not have said handover capability.

13. The network entity of claim 12, wherein the handover capability is Single Radio Voice Call Continuity (SRVCC).

14. The network entity of claim 12, wherein the network entity is a wireless network device for interconnecting a wireless communication device and one or more core networks.

15. The network entity of claim 14, wherein the wireless network device is one of:
  a Home NodeB (HNB), and
  a femtocell with Internet Protocol (IP) Multimedia Subsystem (IMS) capability.

16. An apparatus for processing control messages received by a wireless communication network from a wireless communication device, the apparatus comprising:
  a processor configured to:
    monitor received control messages sent by the wireless communication device to identify control messages conveying information indicating whether or not the wireless communication device has a handover capability associated with performing a handover between packet-switched and circuit-switched domains, and
    for any such identified control message which indicates that the corresponding wireless communication device does not have said handover capability, modify the control message to indicate that said corresponding wireless communication device does have said handover capability and forwarding the modified control message to a core network; and
  a memory configured to store data indicative of whether or not the wireless communication device has said handover capability.

17. The apparatus of claim 16, wherein the control message is one of a General Packet Radio Service (GPRS) Attach message and a Routing Area Update (RAU) message.

18. The apparatus of claim 16, wherein the processor is further configured to:
  store identity information for wireless communication devices which have said handover capability, and
  not store identity information for wireless communication devices not having said handover capability.

19. The apparatus of claim 16, wherein the processor is further configured to store identity information identifying the wireless communication device in association with whether or not the wireless communication device has said handover capability.

20. The apparatus of claim 19, wherein the identity information comprises an International Mobile Subscriber Identity (IMSI).

* * * * *